United States Patent Office 2,896,337
Patented July 28, 1959

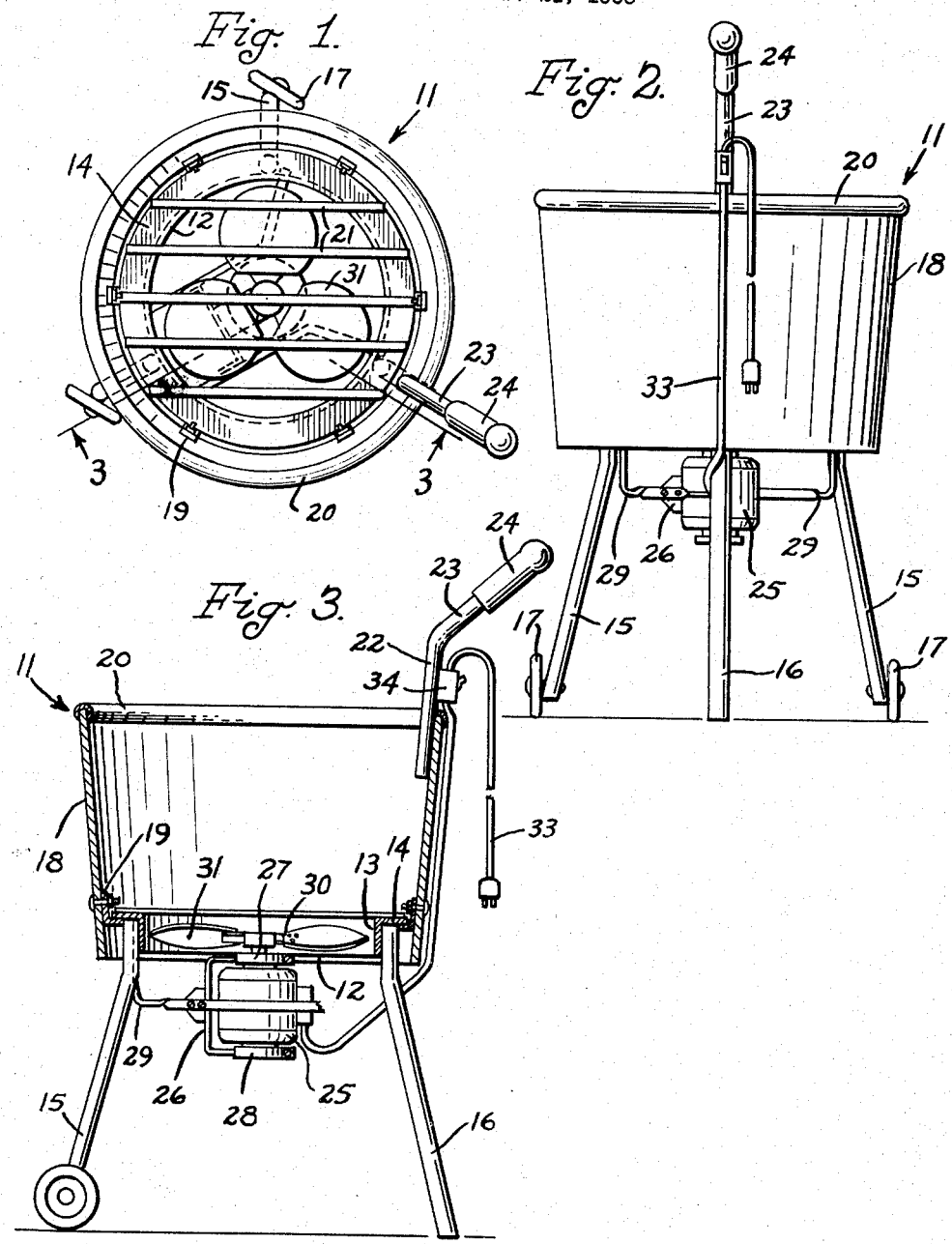

2,896,337

EGG DRYER

Lawrence D. Blythe, White City, Kans.

Application February 21, 1958, Serial No. 716,733

1 Claim. (Cl. 34—218)

This invention relates to drying apparatus, and more particularly to a device for rapidly removing moisture from eggs after they have been washed.

The main object of the invention is to provide a novel and improved egg drying apparatus which is simple in construction, which is relatively compact in size, and which is efficient in operation.

A further object of the invention is to provide an improved egg dryer which is inexpensive to fabricate, which is durable in construction, and which provides a rapidly moving air current which acts to quickly and efficiently dry the eggs placed therein after the eggs have been washed.

Further objects and advantages of the invention will become apparent from the following description and claim, and from the accompanying drawings, wherein:

Figure 1 is a top plan view of an improved egg dryer constructed in accordance with the present invention.

Figure 2 is a side elevational view of the egg dryer shown in Figure 1.

Figure 3 is a vertical cross sectional view taken on the line 3—3 of Figure 1.

Referring to the drawings, the egg dryer is designated generally at 11 and comprises a main frame consisting of a rigid annular ring member 12 which is rightangled in transverse cross section, comprising the depending cylindrical skirt portion 13 and the annular, outwardly extending horizontal flange portion 14. Rigidly secured to the external surface of the cylindrical skirt portion 13 are a plurality of downwardly and outwardly extending rigid leg members, for example, a pair of forward leg members 15, 15 and a rear leg member 16, the forward leg members 15, 15 being provided at their lower ends with wheels 17, whereby the device may be readily rolled to a desired location.

Designated at 18 is an upwardly flaring annular shell member which is secured at its lower portion to the upwardly projecting flanges of a plurality of angle brackets 19 rigidly secured at uniformly spaced locations on the bottom surface of the outwardly projecting annular flange 14 of the ring 12. Thus, the lower flanges of the angle brackets 19 may be welded to the bottom surface of the flange 14 at its peripheral portion, as shown in Figure 3, the upstanding flanges of the angle brackets 19 being inclined upwardly and outwardly to conform with the upwardly flaring contour of the shell member 18.

The shell member 18 is provided on its top edge with a protective strip 20 of generally circular cross sectional shape, whereby to present a smooth top rim.

Rigidly secured to the horizontal flange 14 of the ring 13 are the spaced parallel grill bars 21 which define a horizontal grill in the lower portion of the shell member 18, and whereby said shell member and grill define an upwardly flaring receptacle.

Rigidly secured to the inside surface of the shell member 18 at its upper portion and substantially in the same longitudinal vertical plane as the rear leg 16 is the upwardly extending handle bar 22, the top portion of the handle bar being inclined upwardly and outwardly, as shown at 23, and being provided with a rubber handle grip member 24.

Designated at 25 is an electric motor which is vertically mounted beneath the horizontal grill defined by the parallel grill bars 21, substantially coaxially with the shell member 18, the motor 25 being supported on a bracket frame 26 having top and bottom supporting collar portions 27 and 28 which are clampingly secured to the top and bottom ends of the motor housing, the frame 26 being supported on a plurality of rightangled, radially extending bars 29 which are rigidly secured to the outer surface of the depending skirt member 13, as by welding, or the like. Secured to the top end portion of the motor shaft, immediately beneath the grill bars 21 and disposed within said depending skirt portion 13 is a propeller assembly 30, comprising a plurality of radial propeller blades 31. Thus, the skirt portion 13 defines an intake air duct containing the propeller, and the motor and the propeller assembly 30 define an air blower which is mounted on the main frame portion of the device subjacent the grill bars 21 and which is arranged to provide a substantial air current through the grill bars when the motor 25 is energized.

A line cord 33 is connected to the electric motor 25 through a conventional control switch 34 which is mounted on the lower portion of the handle bar 22 immediately above the rim 20 of shell 18, as is clearly shown in Figure 3.

In using the device, a basket of freshly washed eggs is placed in the shell member 18 and is supported on the horizontal grill bars 21. The line cord 13 is connected to a suitable domestic power receptacle. When the switch 34 is closed, the motor 25 is energized, rotating the blower fan assembly 30, whereby a substantial air current is developed within the ring 13, the air moving past the eggs and causing them to be rapidly and efficiently dried.

As will be readily apparent, the apparatus can be easily moved to an intended location by merely elevating the rear portion thereof by means of the handle bar 22, whereby the device will roll on the wheels 17 and be guided to its intended location.

While a specific embodiment of an improved egg dryer has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

An egg dryer comprising a frame having a plurality of depending supporting legs, a receptacle mounted on said frame, said frame including a generally circular ring member having a horizontal outwardly extending annular top flange and an annular short depending vertical inner skirt portion defining an air intake duct open at its bottom, and a plurality of parallel grill bars secured on said top flange in spaced parallel relationship, defining a horizontal bottom grill assembly, an upwardly flaring annular shell member extending around said bottom grill assembly and completely housing and secured to said circular ring member in the lower portion thereof, and an air blower mounted vertically on said frame beneath said bottom grill assembly, said air blower being arranged substantially coaxially with said shell member and including a multiple-bladed horizontal propeller located immediately subjacent said bottom grill assembly and disposed completely within said vertical skirt portion.

References Cited in the file of this patent

UNITED STATES PATENTS

| 992,622 | Wiebe | May 16, 1911 |
| 1,674,509 | Fisher | June 19, 1928 |
| 2,441,062 | Elsebusch | May 4, 1948 |
| 2,463,218 | Travis | Mar. 1, 1949 |
| 2,732,632 | Koster | Jan. 31, 1956 |